US007420986B1

(12) United States Patent
Howard et al.

(10) Patent No.: US 7,420,986 B1
(45) Date of Patent: Sep. 2, 2008

(54) METHOD AND APPARATUS FOR THE DETECTION AND CLASSIFICATION OF COLLISIONS ON A SHARED RF NETWORK

(75) Inventors: Daniel H. Howard, Atlanta, GA (US); Dolors Sala, Atlanta, GA (US)

(73) Assignee: Broadcom Corporation, Irvine, CA (US)

(*) Notice: Subject to any disclaimer, the term of this patent is extended or adjusted under 35 U.S.C. 154(b) by 1462 days.

(21) Appl. No.: 09/704,809

(22) Filed: Nov. 2, 2000

Related U.S. Application Data

(60) Provisional application No. 60/163,052, filed on Nov. 2, 1999.

(51) Int. Cl.
*H04L 12/413* (2006.01)
(52) U.S. Cl. .................. 370/445; 370/222; 370/252; 370/446; 370/447
(58) Field of Classification Search .............. 370/348, 370/445, 447, 448, 328, 329, 337, 341, 347, 370/431, 442, 443, 252, 446, 222
See application file for complete search history.

(56) References Cited

U.S. PATENT DOCUMENTS

| 3,943,513 | A | * | 3/1976 | Eberhard et al. ............ 342/28 |
| 4,063,220 | A | * | 12/1977 | Metcalfe et al. ............ 370/462 |
| 4,409,593 | A | * | 10/1983 | Bose .................... 340/825.5 |
| 4,481,626 | A | | 11/1984 | Boggs et al. |
| 5,012,467 | A | | 4/1991 | Crane |
| 5,263,050 | A | * | 11/1993 | Sutterlin et al. ............ 375/142 |
| 5,272,700 | A | | 12/1993 | Hansen et al. |

(Continued)

FOREIGN PATENT DOCUMENTS

EP 0 877 511 11/1998

OTHER PUBLICATIONS

A symbol-by-symbol multiuser detector with joint amplitude and delay estimation Iltis, R.A.; Mailaender, L.; Signals, Systems and Computers, 1992. 1992 Conference Record of The Twenty-Sixth Asilomar Conference on , Oct. 26-28.*

(Continued)

*Primary Examiner*—Edan Orgad
*Assistant Examiner*—Andrew C. Lee
(74) *Attorney, Agent, or Firm*—Sterne, Kessler, Goldstein & Fox PLLC

(57) ABSTRACT

The present invention is directed toward a method and apparatus for detecting collisions on a shared access network. In accordance with the present invention, two or more RF modulated signals having a plurality of different phase states are transmitted to a central controller, wherein two or more of the transmitted signals collide at the central controller. The collision detection system then determines a characteristic of the collision signal, such as the absolute value of the peak amplitude of the collision signal. The collision detection system then compares the characteristic with a plurality of thresholds and determines the number of RF modulated signals that collided as a function of the comparison.

The method for detecting collisions may further include monitoring a plurality of collision events to determine a characteristic, such as the absolute value of the peak amplitude of the collision signal, of each of the collision events. The collision detection system then determines the thresholds in accordance with the characteristics of the monitored collision events. The monitored collision events may be simulated or the result of actual laboratory experimentation.

36 Claims, 14 Drawing Sheets

U.S. PATENT DOCUMENTS

| | | | | |
|---|---|---|---|---|
| 5,355,374 | A * | 10/1994 | Hester et al. | 370/461 |
| 5,440,265 | A * | 8/1995 | Cochran et al. | 329/300 |
| 5,657,326 | A * | 8/1997 | Burns et al. | 370/349 |
| 5,717,714 | A * | 2/1998 | Andersson et al. | 372/50.1 |
| 5,719,869 | A | 2/1998 | Ryoo et al. | |
| 5,805,567 | A * | 9/1998 | Ramesh | 370/204 |
| 5,909,470 | A * | 6/1999 | Barratt et al. | 375/324 |
| 5,940,400 | A * | 8/1999 | Eastmond et al. | 370/445 |
| 5,963,557 | A * | 10/1999 | Eng | 370/432 |
| 5,982,763 | A * | 11/1999 | Sato | 370/342 |
| 6,088,406 | A * | 7/2000 | Suzuki | 375/343 |
| 6,154,456 | A * | 11/2000 | Rakib et al. | 370/342 |
| 6,178,161 | B1 | 1/2001 | Terry | |
| 6,205,153 | B1 * | 3/2001 | Shaffer et al. | 370/445 |
| 6,345,045 | B1 * | 2/2002 | Yanagi | 370/342 |
| 6,370,153 | B1 * | 4/2002 | Eng | 370/438 |
| 6,385,773 | B1 * | 5/2002 | Schwartzman et al. | 725/124 |
| 6,389,068 | B1 * | 5/2002 | Smith et al. | 375/225 |
| 6,424,673 | B1 * | 7/2002 | Chen et al. | 375/149 |
| 6,519,229 | B1 * | 2/2003 | Arai et al. | 370/249 |
| 6,529,520 | B1 * | 3/2003 | Lee et al. | 370/442 |
| 6,584,147 | B1 * | 6/2003 | Schaumont et al. | 375/220 |
| 6,614,799 | B1 * | 9/2003 | Gummalla et al. | 370/448 |
| 6,636,494 | B1 * | 10/2003 | Roux | 370/333 |
| 6,650,624 | B1 * | 11/2003 | Quigley et al. | 370/252 |
| 6,665,308 | B1 * | 12/2003 | Rakib et al. | 370/441 |
| 6,763,032 | B1 * | 7/2004 | Rabenko et al. | 370/442 |
| 6,785,292 | B1 * | 8/2004 | Vogel | 370/433 |
| 6,785,564 | B1 * | 8/2004 | Quigley et al. | 455/574 |
| 6,788,734 | B2 * | 9/2004 | Kober et al. | 375/148 |
| 6,836,520 | B1 * | 12/2004 | Chen et al. | 375/354 |
| 6,859,445 | B1 * | 2/2005 | Moon et al. | 370/335 |
| 6,898,204 | B2 | 5/2005 | Trachewsky et al. | |
| 6,901,104 | B1 * | 5/2005 | Du et al. | 375/142 |
| 7,065,125 | B1 * | 6/2006 | Miller et al. | 375/130 |

OTHER PUBLICATIONS

Statistically optimized minislot allocation for initial and collision resolution in hybrid fiber coaxial networks Wei-Ming Yin; Ying-Dar Lin; Selected Areas in Communications, IEEE Journal on , vol. 18, Issue: 9 , Sep. 2000.*

A Method to Partially Suppress ISI and MAI for DS SS CDMA Wireless Networks Wysocki, B.J. 0-7803-3925-8/97 1997 IEEE.*

A Revuew of Contention Resolution Algorithms for IEEE 802.14 Netwotk Golmie, N., Saintillan, Y., Su, D.H. IEEE Communications Surveys, First Quarter 1999.*

* cited by examiner

METHOD AND APPARATUS FOR THE DETECTION AND CLASSIFICATION OF COLLISIONS ON A SHARED RF NETWORK

CROSS-REFERENCE TO RELATED APPLICATION

This application claims priority to U.S. Provisional Patent Application No. 60/163,052, filed Nov. 2, 1999 the content of which is hereby incorporated by reference.

FIELD OF THE INVENTION

The present invention relates generally to telecommunications systems and more particularly to an apparatus and method for detecting and classifying collisions on a shared access RF network.

BACKGROUND

Data and voice communications systems often employ frequency division multiplexing (FDM) to increase the bandwidth of the system. FDM allows two or more simultaneous and continuous channels to be derived from a shared access transmission medium. FDM assigns separate portions of the available frequency spectrum, separated by some minimal channel spacing within a block of spectrum, to each of the individual channels. However, FDM only provides for a fixed number of physical channels (i.e. separate frequencies) in a shared access network.

Therefore, many communication systems utilize time division multiplexing (TDM) to provide more channels and to increase the number of users that may operate on a shared access network. TDM provides time division multiple access (TDMA) in which users share a carrier frequency in the communications system by requesting and being granted a limited amount of time to transmit over the time division multiplex channel (time slots). In effect, each user gets assigned a different time slot on the same frequency. In this way many users can share the same frequency. The occurrence of simultaneous transmissions by two or more stations is called a collision. In data and voice networks using contention based request slots in a shared access media, such as for example cable, wireless and power data and voice networks, the signals often collide when attempting to randomly access the shared access network.

When a collision occurs on an Ethernet or other baseband network, the voltages of the received signals add in a linear fashion. Therefore, collision detection systems for baseband networks typically monitor the signal level on the coaxial cable or other transmission medium and a call a collision when the received signal level is in excess of that generated by the local transmitter. Further, because the voltages add linearly for baseband networks, the number of signals colliding may also be determined by dividing the peak signal level on the coaxial cable by the nominal amplitude of a single transmission.

However, in RF transmission systems (such as for example, a cable or wireless network) the information signal is modulated onto an RF carrier. Further, in typical RF transmission systems the phase of the signals transmitted by the individual stations are not synchronized. The lack of phase synchronization may create a random phase offset between the signals transmitted by the individual stations. Therefore, in a typical RF transmission system the phase of the signals that collide at the receiver may not be aligned and the signal level of the received signal may not directly correlate, in a linear manner, to the number of signals that collided. In fact, the random phase offset between the colliding signals may result in signals adding constructively (in phase), destructively (180 degrees out of phase) or at any level between the two extremes. Therefore, relatively ideal collision detection schemes employed in baseband networks may not provide accurate collision detection in a shared access RF network.

Frequently in typical request-grant systems, the station or modem assumes that a collision has occurred when a grant or grant pending indication for a particular request is not present in the next downstream media allocation and partitioning (MAP) cycle. Thus, in these typical systems, conflict resolution is delayed until the next available MAP cycle.

In current shared access RF networks such as for example, Data Over Cable Service Interface Specification (DOCSIS), the cable modem termination system (CMTS) may attempt to infer that a collision has occurred via physical layer or protocol algorithms. The CMTS may for example, call a collision event based on differences in signal to noise ratio between the preamble and the packet, or may infer that a collision event has occurred via protocol state transitions. Alternatively, a collision event may also be called in current systems when there is energy in a contention mini-slot but the data in that mini-slot can not be decoded due to a failed header check sequence (HCS) or failed synchronization. However, conventional collision detection systems may not accurately distinguish errors due to a collision of two or more signals from errors due to other channel impediments that may otherwise corrupt the channel.

Current systems typically incorporate contention resolution algorithms (CRAs) along with collision detection algorithms to minimize the delay in re-transmitting access requests. Contention resolution algorithms typically utilize information supplied by the CMTS to control the retransmission of failed requests as well as other transmission parameters. In this context, the information extracted from the result of the transmission is referred to as feedback.

In operation the CMTS of a DOCSIS compatible shared access RF network typically collects information on how many total collisions occur in the system. Typical DOCSIS compatible collision detection algorithms generate binary feedback in the form of collision (C)/non-collision (NC) decisions and do not estimate the number of users or signals involved in each collision event. However, theoretical studies have shown CRAs may more readily distinguish collisions from errors if the CMTS or central controller not only detects the occurrence of a collision but also estimates the number of signals that collided (also referred to as multiplicity of collision).

However, due to the non-linear nature of collision events in shared access RF networks it is difficult to directly obtain accurate feedback on the multiplicity of collision. Therefore, current multiplicity estimators are often protocol-based and estimate the multiplicity of collision in accordance with the number of collisions that previously occurred on the system. Protocol methods directly depend on the CRA algorithm used because future collisions depend on how often the users retransmit a failed transmission.

Therefore, it would be advantageous to provide a physical layer detector for estimating the multiplicity of collision based on channel information.

SUMMARY OF THE INVENTION

In one aspect of the present invention a method for detecting collisions on a shared access network includes transmitting two or more RF modulated signals having a plurality of different phase states, wherein two or more of the transmitted signals collide at a central controller, correlating the collision signal with a plurality of stored parameters, and determining the number of transmitted signals that collided as a function of the correlation.

In another aspect of the invention, a data communication system includes two or more subscriber RF transceivers, and a central controller having one or more controller transceivers in two way communication with the subscriber transceivers and a collision detection system. The collision detection includes a correlation processor for correlating a characteristic of a collided RF waveform with a plurality of stored characteristics, wherein the number of received signals involved in a collision event is determined in accordance with the correlation.

In another aspect of the present invention, a method for detecting collisions on a shared access network, includes transmitting two or more RF modulated signals having a plurality of different phase states, wherein two or more of the transmitted signals collide at a central controller, determining a characteristic of the collision signal, such as the absolute value of the peak amplitude and comparing the characteristic with a plurality of predetermined thresholds. An exemplary collision detection method then determines the number of RF modulated signals that collided as a function of the comparison.

The method for detecting collisions may further include monitoring a plurality of collision events to determine the characteristic of each of the collision events, and determining the predetermined thresholds in accordance with the characteristics of the monitored collision events. The monitored collision events may be simulated or the result of actual laboratory experimentation. One of skill in the art, will appreciate that characteristics other than the absolute value of the peak amplitude of the collided signal, such as for example, the peak to minimum value, average peak value, etc. may be used to establish thresholds for determining the number of colliding stations.

It is understood that other embodiments of the present invention will become readily apparent to those skilled in the art from the following detailed description, wherein it is shown and described embodiments of the invention by way of illustration of the best modes contemplated for carrying out the invention. As it will be realized, the invention is capable of other and different embodiments and the details are capable of modification in various other respects, all without departing from the spirit and scope of the present invention. Accordingly, the drawings and detailed description are to be illustrative in nature and not restrictive.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

An exemplary embodiment of the present invention provides a method and apparatus for detecting the occurrence of a collision early in the signal processing of received signals. In addition, the present invention further provides a robust estimate of the number of signals that collided allowing for the implementation of optimized CRAs and scheduling algorithms to reduce system latency and to increase network efficiency. In order to appreciate the advantages of the present invention, it will be beneficial to describe the invention in the context of an exemplary bi-directional communication network, such as for example, a hybrid fiber coaxial (HFC) network.

Figure 1:
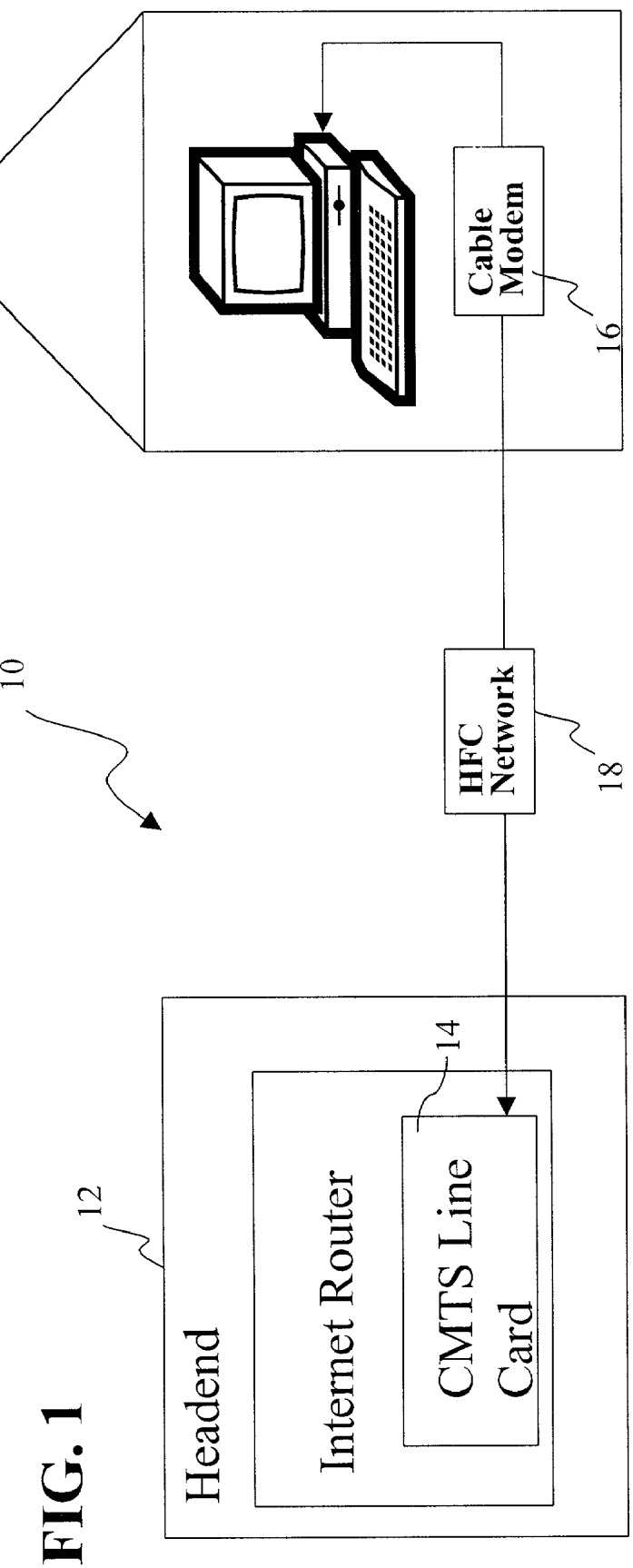
FIG. 1 is a simplified block diagram of a cable modem system demonstrating an implementation of an exemplary collision detection system.

A simplified block diagram of a particular exemplary implementation is depicted in FIG. 1. An exemplary DOCSIS compatible network 10 includes a headend 12 having a cable modem termination system (CMTS) 14 located at a cable company facility. CMTS 14 functions as a modem that services a large number of subscribers each subscriber having customer premise equipment such as for example a cable modem 16 via a HFC network 18. An exemplary CMTS for use with the present invention is disclosed in U.S. patent application Ser. No. 09/574,558, entitled "CABLE MODEM APPARATUS AND METHOD", filed May 19, 2000 the content of which is incorporated fully herein by reference. In this and other embodiments, common reference numerals may be used to represent like components.

Figure 2:
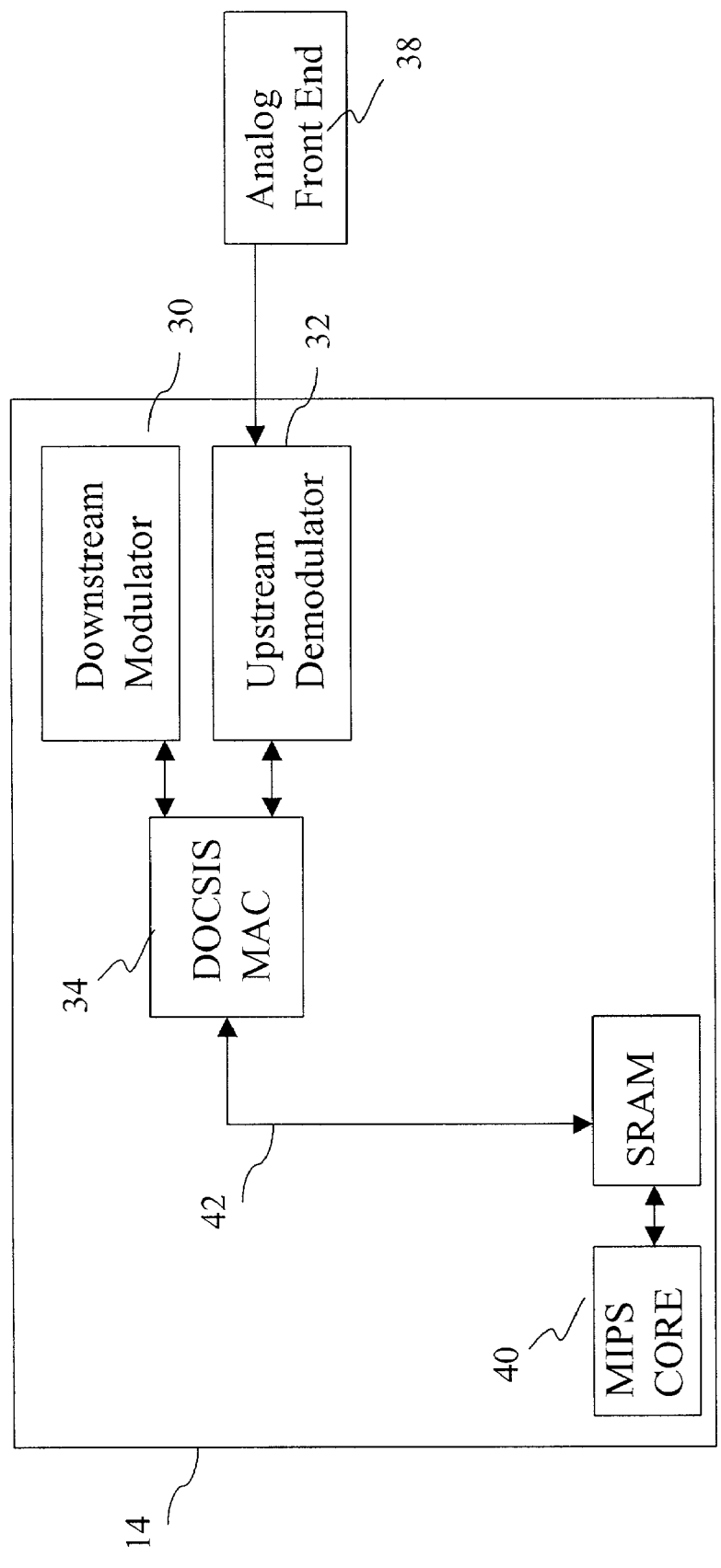
FIG. 2 is a simplified block diagram of a cable modem termination system in accordance with an exemplary embodiment of the present invention.

Referring to FIG. 2, cable modem termination system 14 includes a downstream modulator 30 for facilitating the transmission of data communications to the cable modems and an upstream demodulator 32 for facilitating the reception of data communications from the cable modems. Downstream modulator 30 may utilize, for example, 64 QAM or 256 QAM in a frequency band in the range of 54 to 860 MHz to provide a data rate of up to 56 Mbps. Upstream demodulator 32 may use either QPSK or 16 QAM, in a frequency range of 5 MHz to 42 MHz, to provide a data rate of up to 10 Mbps.

A media access controller (MAC) 34 encapsulates data received from a data network interface with the appropriate MAC address of the cable modems on the system. Each cable modem on the system (not shown) has its own MAC address. Whenever a new cable modem is installed, its address is registered with MAC 34. The MAC address is necessary to distinguish data from the cable modems since all the modems share a common upstream path, and so that the system knows where to send data. Thus, data packets, regardless of format are mapped to a particular MAC address.

In order to accomplish TDMA for upstream communication, the CMTS assigns time slots within which cable modems having a message to send to the CMTS are allowed to transmit. The assignment of such time slots is accomplished by providing a request contention area in the upstream data path within which the cable modems are permitted to contend in order to place a message which requests additional time in the upstream data path for the transmission of their message. In the described exemplary CMTS, MIPS core 40 in conjunction with its resident SRAM memory, provide contention resolution and scheduling functions to maximize the efficiency of the network by adjusting the number of time slots in accordance with network traffic patterns. Further, MIPS core 40 interprets management messages and provides basic database management functions.

Because of the use of TDMA, the CMTS 14 uses a burst receiver, rather than a continuous receiver, to receive data packets from cable modems via upstream communications. The burst receiver of the CMTS includes an analog front-end 38 having an analog-to-digital converter (not shown) that receives analog data packets from an upstream channel and converts the analog data packets into digital data packets. Upstream demodulator 32 amplifies the digitized data packets and demodulates the amplified signal with recovered clock and carrier timing. Matched filters and adaptive filters remove multi-path propagation effects and narrowband co-channel interference. An integrated decoder may also perform error correction and forwards the processed received data, in either parallel or serial MPEG-2 format to DOCSIS MAC 34.

Figure 3:
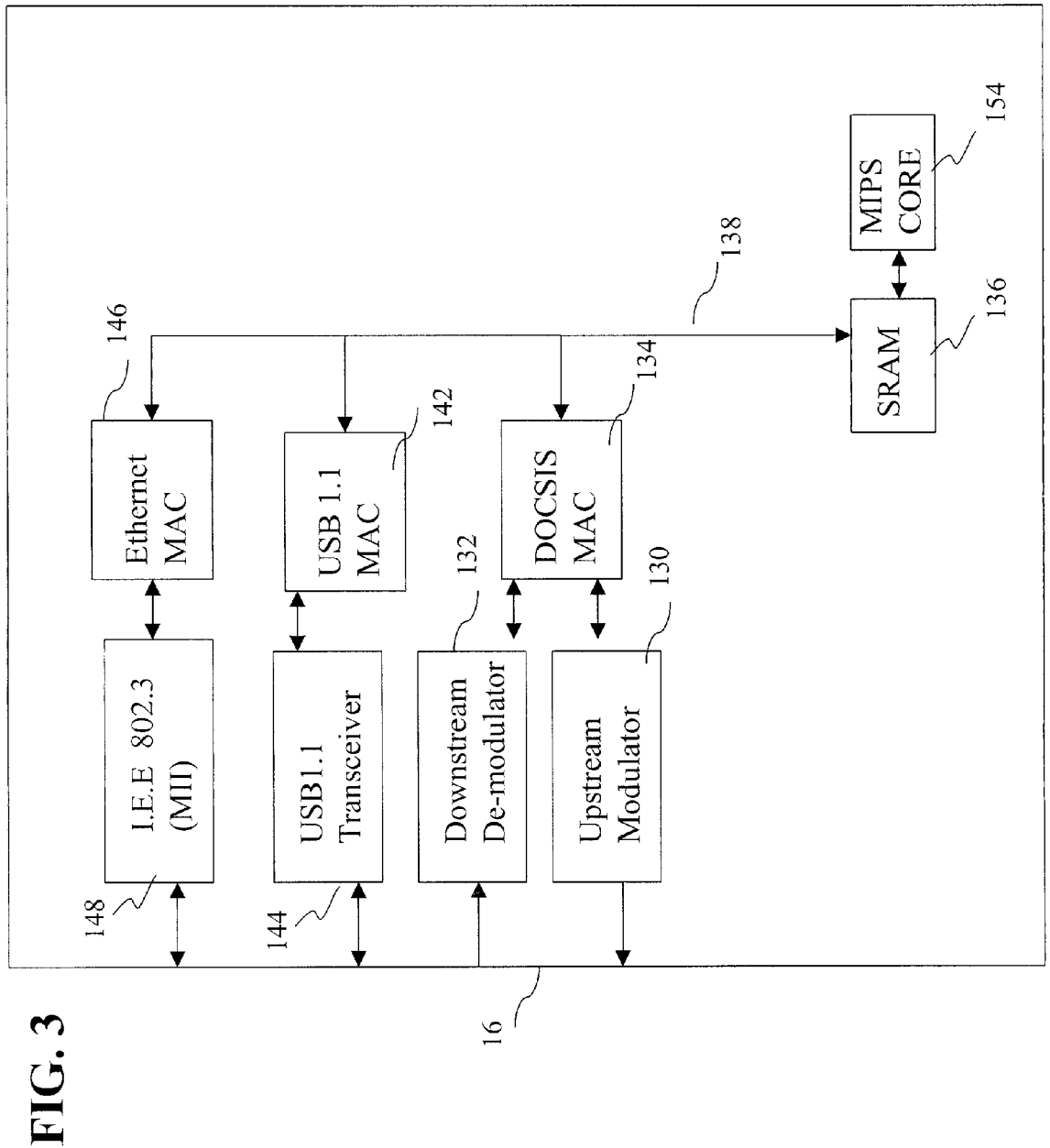
FIG. 3 is a simplified block diagram of a cable modem in accordance with an exemplary embodiment of the present invention.

An exemplary cable modem is shown schematically in FIG. 3. The described exemplary embodiment may provide an integrated, DOCSIS compliant, single chip solution, as disclosed in U.S. patent application Ser. No. 09/548,400, entitled "GATEWAY WITH VOICE" filed Apr. 13, 2000, the contents of which are incorporated herein by reference as if set forth in full. The described exemplary embodiment can provide integrated functions for communicating with far end devices via the CMTS (not shown). For example, a QPSK upstream modulator 130 transmits data to a far end data terminating device and a QAM downstream demodulator 132 receives data from the far end data terminating device via a CMTS.

Upstream modulator 130 and downstream demodulator 132 interface with a DOCSIS MAC 134. DOCSIS MAC 134 implements the downstream portions of the DOCSIS protocol. DOCSIS MAC 134 extracts DOCSIS MAC frames from MPEG-2 frames, processes MAC headers, and filters and processes messages and data. Downstream data packets and message packets may then be placed in system memory 136 via an internal system bus (ISB) 138.

In addition, the described cable modem can support multiple peripherals in accordance with a variety of protocols. For example, a universal serial bus transceiver 144 and USB MAC 142 provide transparent bi-directional IP traffic between communications devices operating on a USB such as for example a PC workstation, server printer or other similar devices and the far end data terminating device. Additionally, an I.E.E.E. 802.3 compliant media independent interface (MII) 148 in conjunction with an Ethernet MAC 146 may also be included to provide bi-directional data exchange between communications devices such as, for example a number of PCs and or Ethernet phones and the far end data terminating device.

In typical RF transmission systems, such as the HFC network featured in FIG. 1, the phase of the signals transmitted by the individual stations are not synchronized. The absence of phase synchronization may create a random phase offset between the signals transmitted by the individual stations. Therefore, in a typical RF transmission system the phase of the signals that collide at the CMTS or central controller may not be aligned. In this instance the received signals may not add in a linear fashion.

Further, the relative phase relationship between colliding signals may vary during the transmission of a burst on the upstream channel due to phase noise in the individual transmitted signals. Therefore, in typical shared access RF networks the amplitude of the collided signal may not linearly correlate to the number of signals that collided. However, we have found that varying levels of collision peaks, some as large as 10 dB above the nominal received power level for a single transmission may be detected at the physical layer (PHY) of the CMTS by observing the power as a function of time on the upstream channel.

Figure 4:
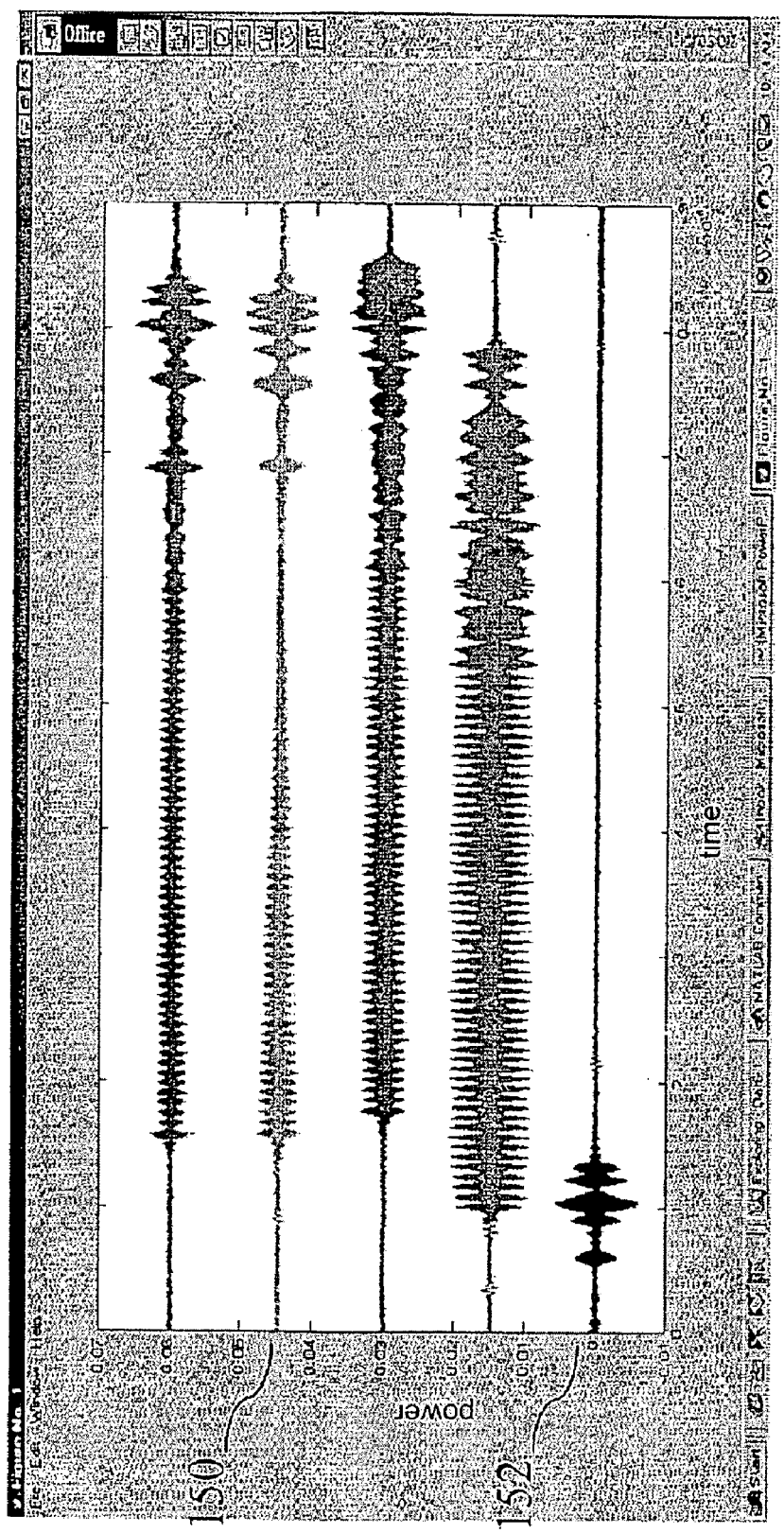
FIG. 4 is a graphic illustration of the peak power of a collision event as a function of time for five representative collision events.

For example, FIG. 4 graphically illustrates power versus time for five collision events on the upstream channel at the CMTS, for upstream signals communicated via QPSK modulation. The first part of each request packet is the preamble. The random phase offset between the carriers of the collided request packets may produce a power level in the preamble of a collided packet that is greater than or less than the power level of a single transmission. In addition, if the phase noise of the upstream modulators of cable modems is large enough, the amplitude of the preamble will vary during the collided packet, as shown in the second trace 150. In fact, on the last trace 152, the preamble of the received signal is almost entirely eliminated by destructive addition of the colliding signals. However, as seen in the illustrated collision 152, even when the preamble is nearly eliminated by destructive interference, the data portion of the request may still contain large power peaks.

In accordance with an exemplary embodiment of the present invention, the upstream modulator of the subscriber cable modems may utilize a higher order modulation technique to increase the number of different phase states present in a transmitted signal. Such techniques shift the phase of the electromagnetic carrier wave by an amount corresponding to the symbol being encoded. For example, QPSK modulation may be used, so that there are four possible phase states for each symbol. In operation, the level of interference between two or more colliding signals may vary in accordance with the random phase offset between the colliding signals as well as the actual symbols that collide.

Therefore, even if the carriers of colliding signals on the upstream channel are substantially out of phase during the preamble, with near complete cancellation, the collision amplitude will be a peak for two symbols that are at opposite diagonals (i.e. 180 degrees out of phase) of the constellation. Hence, the likelihood that symbols will combine in random patterns during a collision event on the upstream channel creates the possibility that the phase of two symbols will substantially align during a collision. The amplitudes of the aligned symbols will then substantially add to create a peak in the signal level of a collided signal, regardless of the random phase offset between the transmitted RF carriers.

In operation, if the number of colliding symbols in an upstream signal is large relative to the number of colliding signals, there is a high likelihood that the CMTS will receive a combination of symbols that constructively add in phase. In this instance, the maximum amplitude during a collision would be very near N times the amplitude of a single transmission, where N is the number of colliding signals. The amplitude would generally be less, due to the fact that the phase can still be off by a fraction of a cycle. The fractional error however, would be less than a quarter of a cycle for QPSK modulation that utilizes four phase states per symbol.

However, as the number of colliding signals increases, the probability that the colliding signals include all possible combinations of symbols decreases, as does the probability that each of the colliding signals will add substantially in phase. In addition laser return amplifiers and/or RF amplifiers in the HFC network 18 (see FIG. 1) may saturate at high peak power levels. Therefore, in operation, heavy network traffic in the form of a large number of online stations as well as saturation effects may limit the maximum amplitude of a collided signal and complicate the detection and classification of collisions.

An exemplary embodiment of the present invention optimizes the format of an upstream packet to increase the number of unique phase states within the signals transmitted by the subscriber cable modems. The large number of different phase states increases the probability that at least a portion of the collided waveform will be formed by the constructive addition of substantially aligned colliding symbols. The colliding symbols having relative phases that are in near alignment produce a peak in the amplitude of the collided waveform that may be correlated with the number of colliding signals.

Figure 5:
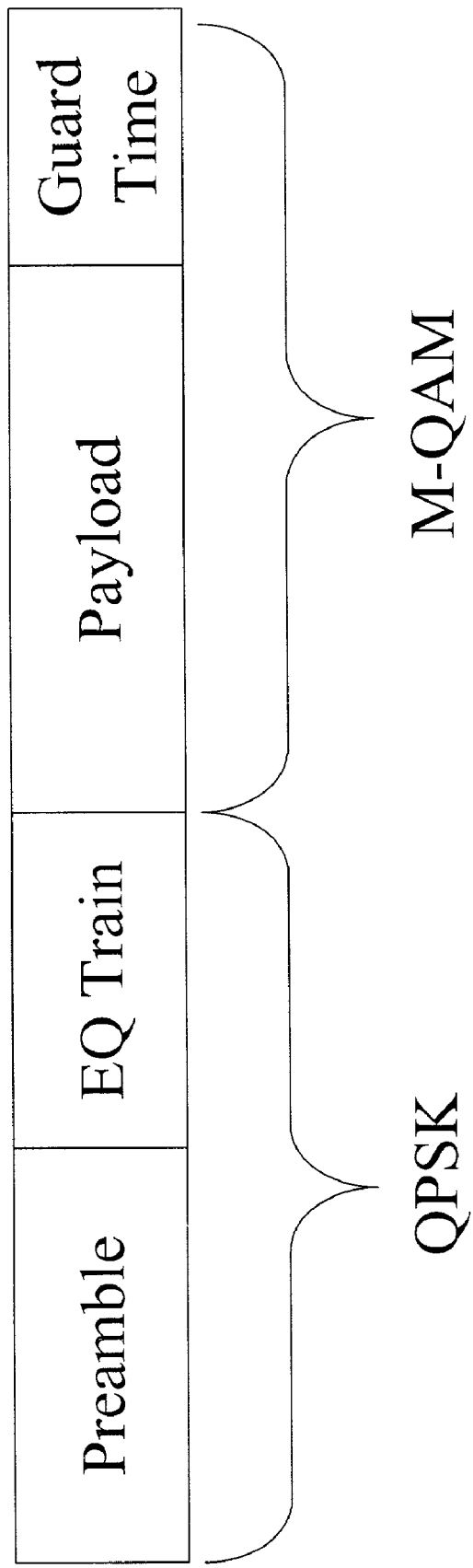
FIG. 5 is an exemplary frame structure of a time division multiple access packet.

Referring to FIG. 5, upstream TDMA signals generally include a preamble that is used for synchronization, an equalizer training sequence, a data payload, and a guard time that separates bursts in the time domain. The format of each portion of the signal transmitted by the upstream modulator of the subscriber cable modems may be altered to maximize the probability that at least one symbol from each of the colliding signals will be substantially aligned. In the described exemplary embodiment, the phase difference between at least one symbol of each of the colliding signals is preferably less than about +/−22.5 degrees. The described exemplary embodiment may utilize a plurality of approaches to maximize the probability of near symbol alignment during the occurrence of a collision.

In one embodiment, the upstream modulator of the subscriber cable modems may use phase varying techniques that keep the amplitude of the transmitted signal constant. For example, an exemplary collision detection system may use a random binary sequence for the preamble that is shared by all stations. Alternatively, the upstream modulators may modulate the preamble of an upstream packet with higher order modulation techniques, such as for example, 8-PSK or 16-PSK, with constant symbol amplitudes to increase the number of different phase states in the preamble.

However, it is also possible to correlate the peak amplitude of a collision event on the upstream channel with the number of stations colliding when the upstream modulators utilize pulse shaping techniques in conjunction with variable signal amplitudes. Similarly, higher order modulation may be utilized in the payload, with Nyquist shaping of symbols, to produce additional variable phase states as well as additional variable amplitude states. In addition, a collision detection system may utilize payload randomization beyond that which naturally occurs to further increase the number of phase states in the payload portion of the request packet. Alternatively phase encoding schemes such as for example, linear FM, quadratic PM, or CDMA may be utilized to increase the number of unique phase states in the preamble of the transmitted signal.

Figure 6:
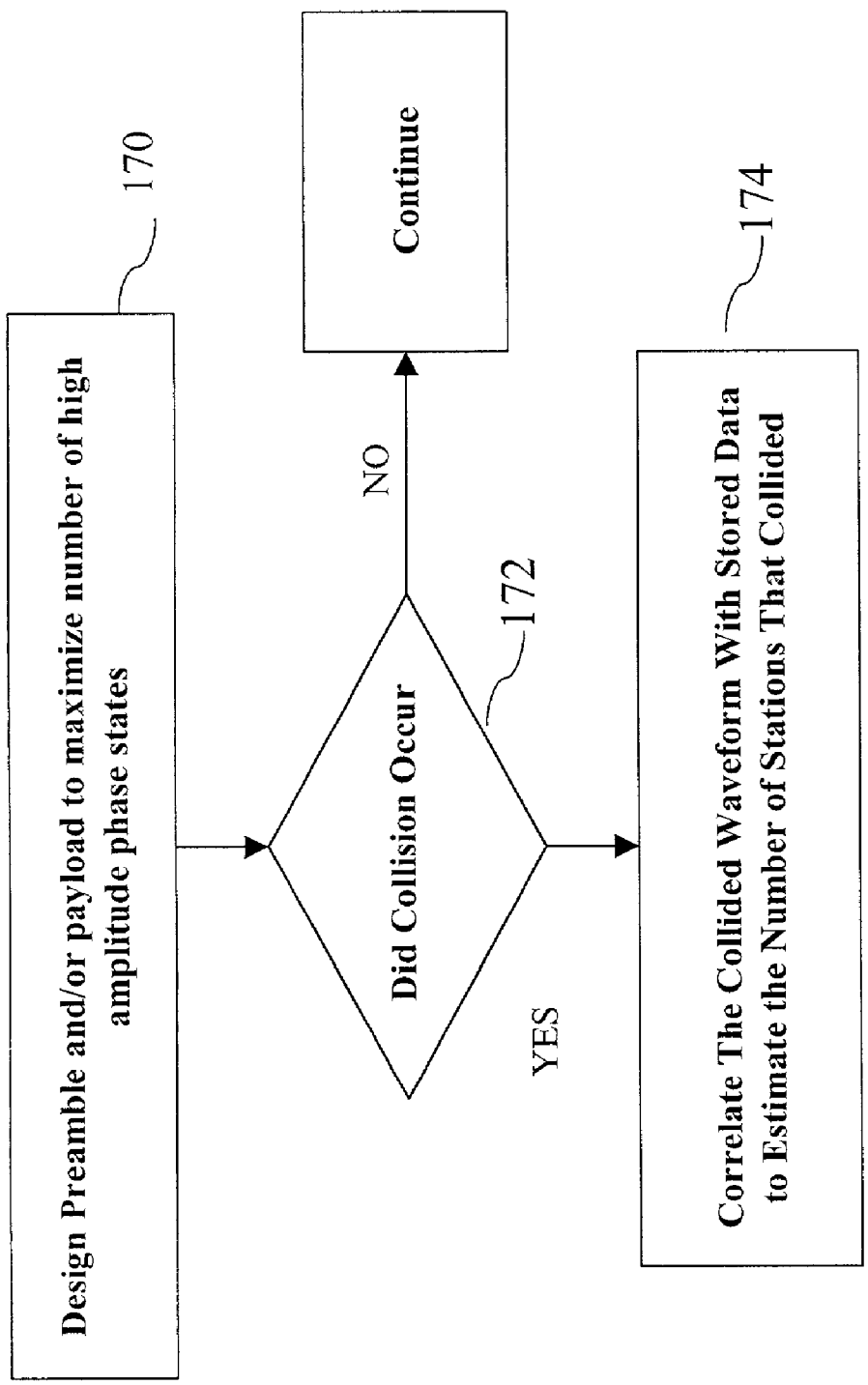
FIG. 6 is a flow diagram demonstrating the operation of an exemplary collision detection system in accordance with an exemplary embodiment of the present invention.

Referring to FIG. 6, in an exemplary embodiment of the present invention, the preamble and/or the payload of a request packet transmitted upstream by the subscriber cable modems is designed to maximize the number of different phase states in the upstream packet for the purpose of determining the number of stations that collided 170. For example, in one embodiment, the upstream modulator of the subscriber cable modems may utilize QPSK modulation without Nyquist shaping. A random sequence may be used for the preamble and a random distribution of symbols in the request packet such that a total of forty eight random symbols are contained in each request burst, resulting in a designed random distribution of forty eight symbols during a burst.

The described exemplary collision detection system may then determine whether a collision has occurred 172. An exemplary collision detection system may utilize power measurements in the PHY layer, namely the CMTS upstream demodulator 32 (see FIG. 2) to detect collision events. For example, in one embodiment, the MIPS core of the CMTS detects the peak power level of each symbol, and then compares the minimum and maximum peak symbol power levels in the collided waveform on a symbol by symbol basis. If the power difference is greater than X times the normally expected difference, where X is in the range of 1.5 to 2.0 dB, the MIPS core assumes that a collision event has occurred. However, one of skill in the art will appreciate that the normally expected difference between maximum and minimum peak symbol power level varies depending on the modulation technique used. If a collision has occurred an exemplary collision detection system correlates the collided waveform with stored data to estimate the number of colliding signals 174.

Mathematical simulations or direct laboratory measurements may be utilized to investigate the variation of the amplitude of the collision as well as the correlation of the peak amplitude of the collision with the number of colliding signals. In one embodiment an exemplary collision detection system compares the peak amplitude of the collided waveform to a threshold value established through mathematical simulation to estimate the number of colliding signals.

Figure 7:
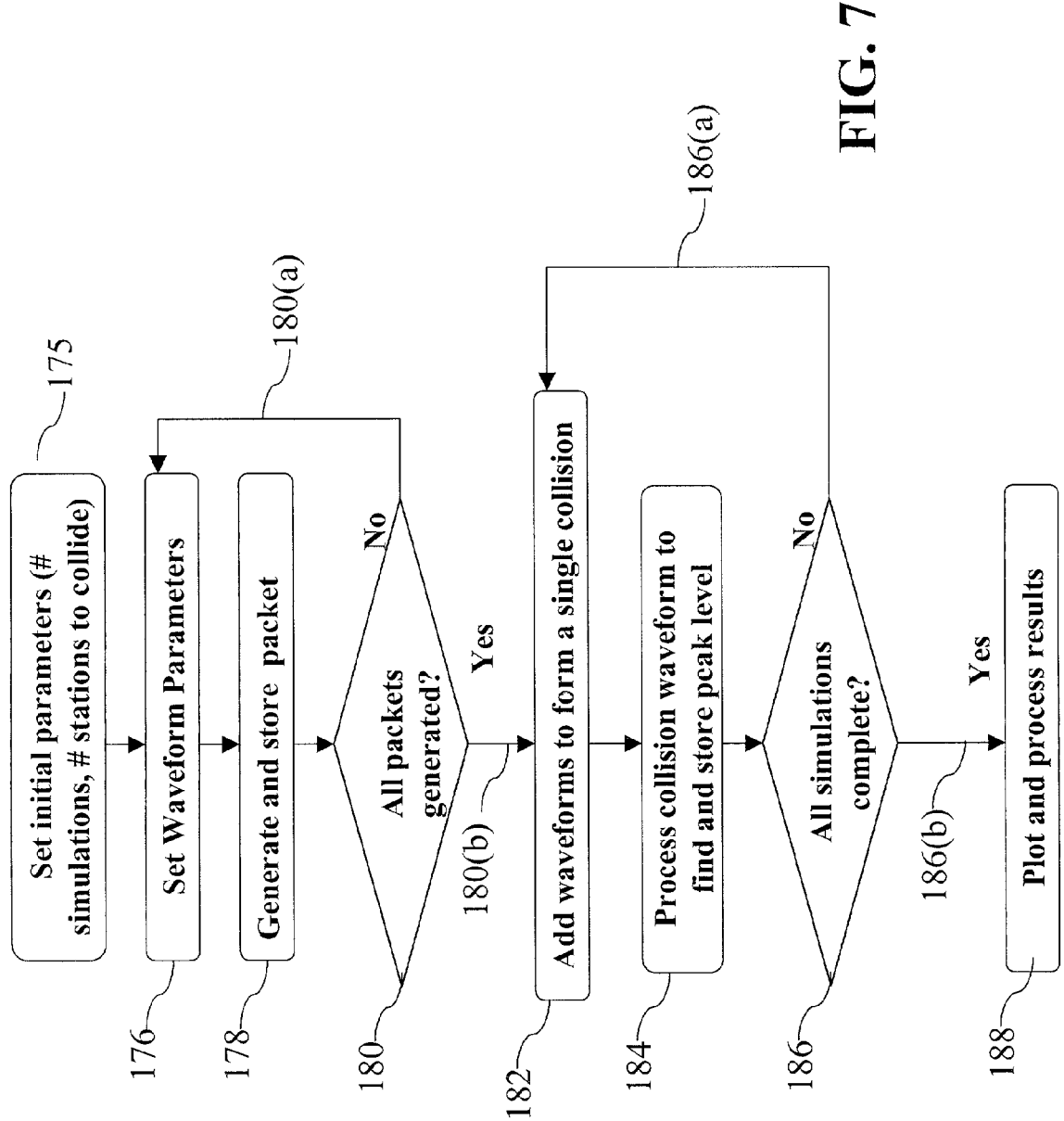
FIG. 7 is a flow diagram of a collision simulation algorithm in accordance with an exemplary embodiment of the present invention.

FIG. 7 is a flow diagram of an exemplary algorithm for simulating collision events on the upstream channel at the CMTS. In accordance with the described exemplary simulator, a user may initially establish the operating parameters of the simulation 175 such as for example, the number of simulations to execute or the number of colliding stations. The user may then set the operating parameters, such as for example, modulation rate, number of samples per wavelength, number of different phase states etc. for the upstream waveform transmitted by the subscriber cable modems 176. The mathematical collision simulation algorithm then generates and stores a first data packet 178. If a packet has been generated for each colliding station 180(*b*), the packet waveforms are added to form a single collision waveform 182 in accordance with a user defined collision event. Otherwise the collision simulator generates and stores additional packet waveforms 180(*a*).

The collision waveforms are processed to locate and store the peak amplitude level for each simulated collision 184. If a collision signal has been generated and analyzed for each user defined collision event 186(*b*) the simulator processes and plots the results 188. Otherwise, additional collision waveforms are generated and stored 186(*a*). One of skill in the art will appreciate that alternate simulation algorithms may be used to simulate collisions on a shared access RF network. Further, direct laboratory measurements may be used in lieu of mathematical simulations to investigate the variation of the amplitude of collision events as well as the correlation between the amplitude of the collision and the number of colliding signals. Therefore, the described collision simulator is by way of example only and not by way of limitation.

Figure 8:
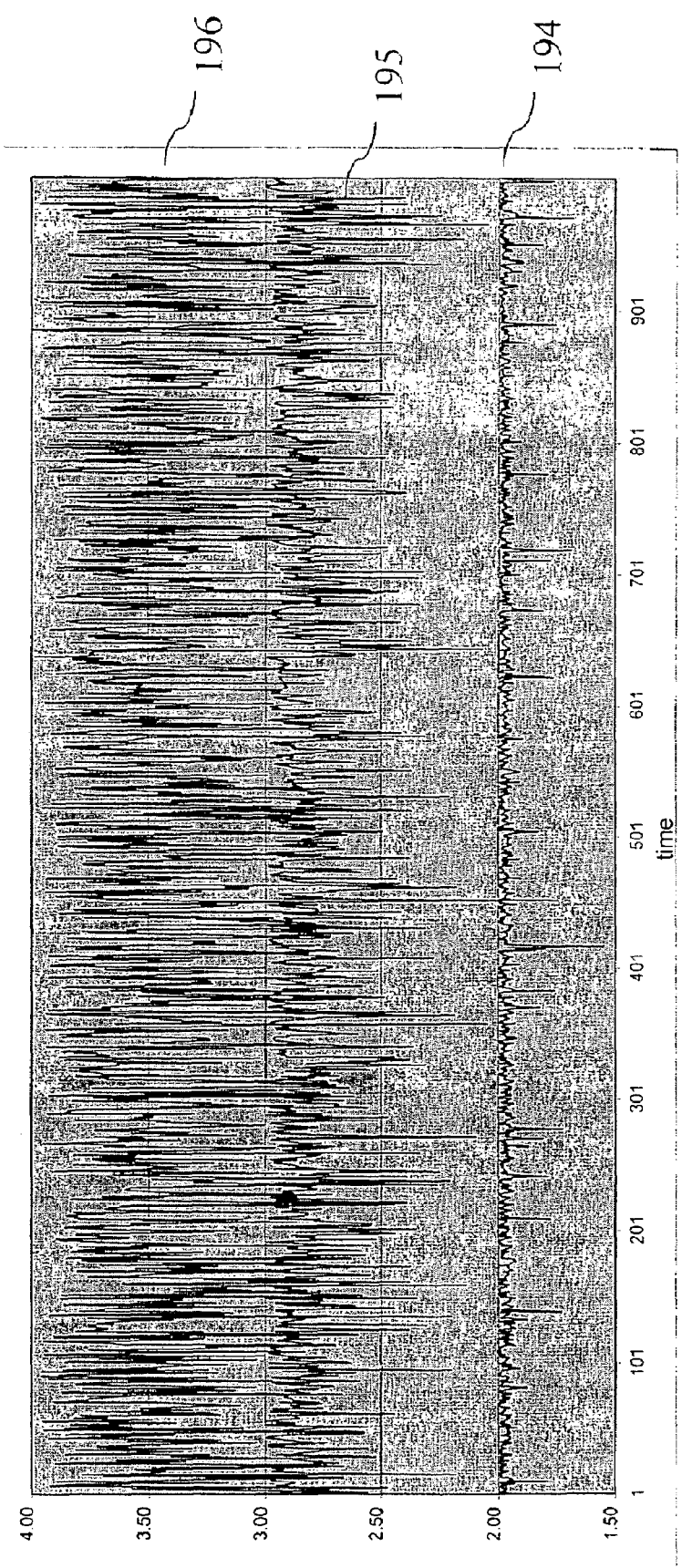
FIG. 8 is a graphical illustration of the peak signal level for collisions involving two, three and four colliding signals in accordance with an exemplary embodiment of the present invention.

FIG. 8 graphically illustrates the peak signal level from each of one thousand simulated collisions on the upstream channel, relative to the amplitude of a single transmission, for collisions involving two colliding signals 194, three colliding signals 195 and four colliding signals 196. In the illustrated example, the colliding upstream signals use QPSK modulation without Nyquist shaping and forty eight random symbols are transmitted in each burst. It can be seen that for a collision involving two colliding signals the maximum amplitude during the collision of two signals is nearly two times the amplitude of a single transmission. In addition, the distribution of peaks for two colliding signals 194 is relatively compact and correlates very well to the number of stations colliding.

However, as the number of colliding signals increases to three and four, the maximum amplitudes are both lower and more variable. For three colliding signals 195, the maximum collision amplitude is in the range of about 2.3 and 3.0. However, collision peaks between 2.3 and 3.0 can not be uniquely attributed to collision involving three colliding signals since occasionally a four station collision peak is below 3.0.

Figure 9:
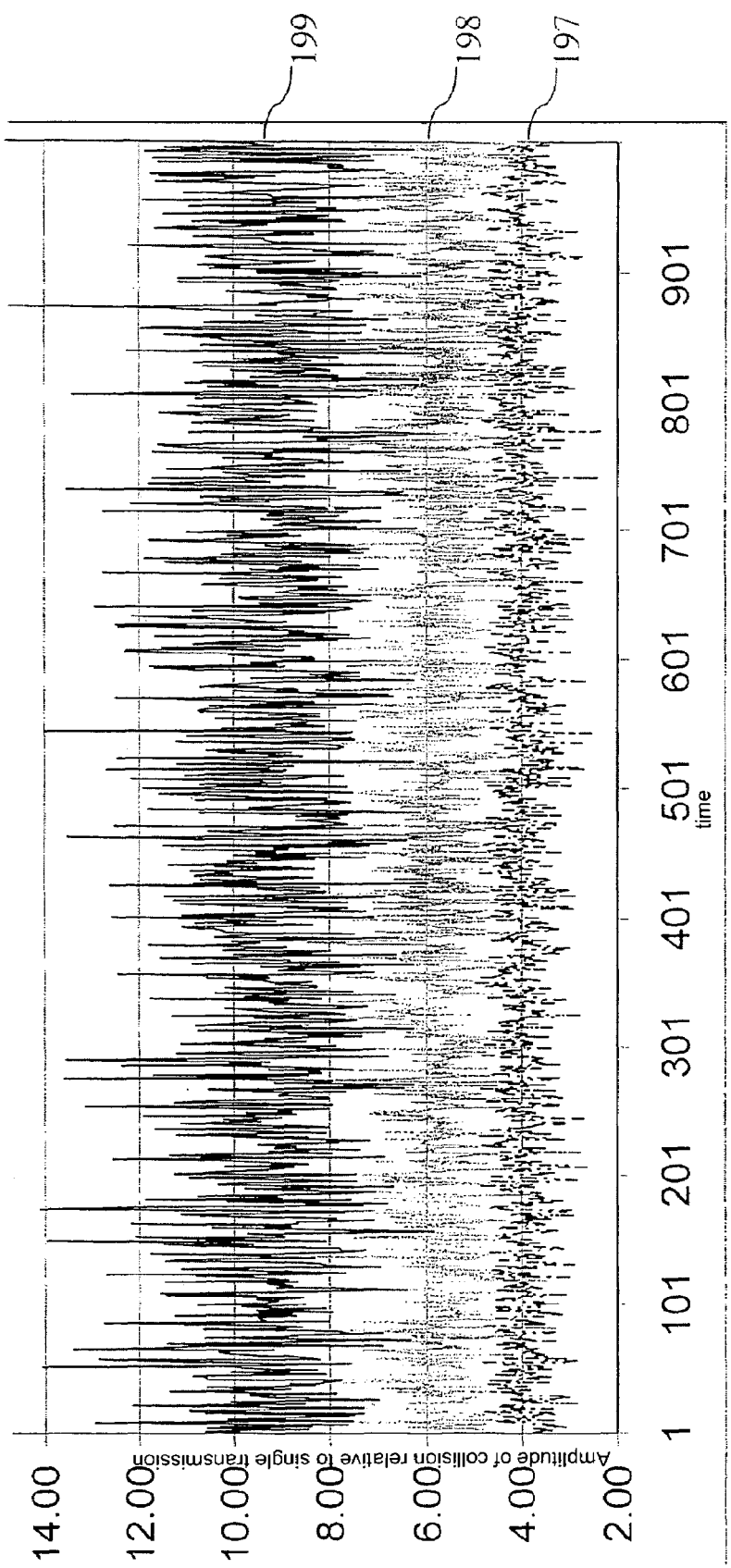
FIG. 9 is a graphical illustration of the peak signal level for collisions involving five, ten, and twenty five colliding signals in accordance with an exemplary embodiment of the present invention.

Referring to FIG. 9, the maximum amplitude during a collision further varies from an ideal linear correlation between the number of colliding signals and the amplitude of a single transmission, for collisions involving additional colliding signals. For instance, the maximum amplitude for five colliding signals 197 over the course of one thousand collisions is on the order of about 4.25. The correlation further degrades from ideal for ten colliding signals 198 where the maximum amplitude is on the order of about six and one-half, and twenty five colliding signals 199 where the maximum amplitude is in the range of about twelve to fourteen. Thus as the number of colliding signals increases, the maximum amplitude deviates further from the ideal N times the amplitude of a single signal and also varies over a wider range of amplitudes.

However, in general, the peak collision amplitude does increase with increasing number of colliding signals. Thus, when the collision amplitude is greater than the ideal threshold for N signals (i.e. N times the amplitude of a single signal) an exemplary collision detection system may conclude that the number of colliding signals is greater than N. For example, if the detected peak power for a particular collision is greater than three times the amplitude of an uncollided packet, it may be assumed that the number of stations colliding is greater than or equal to four.

Figure 10:
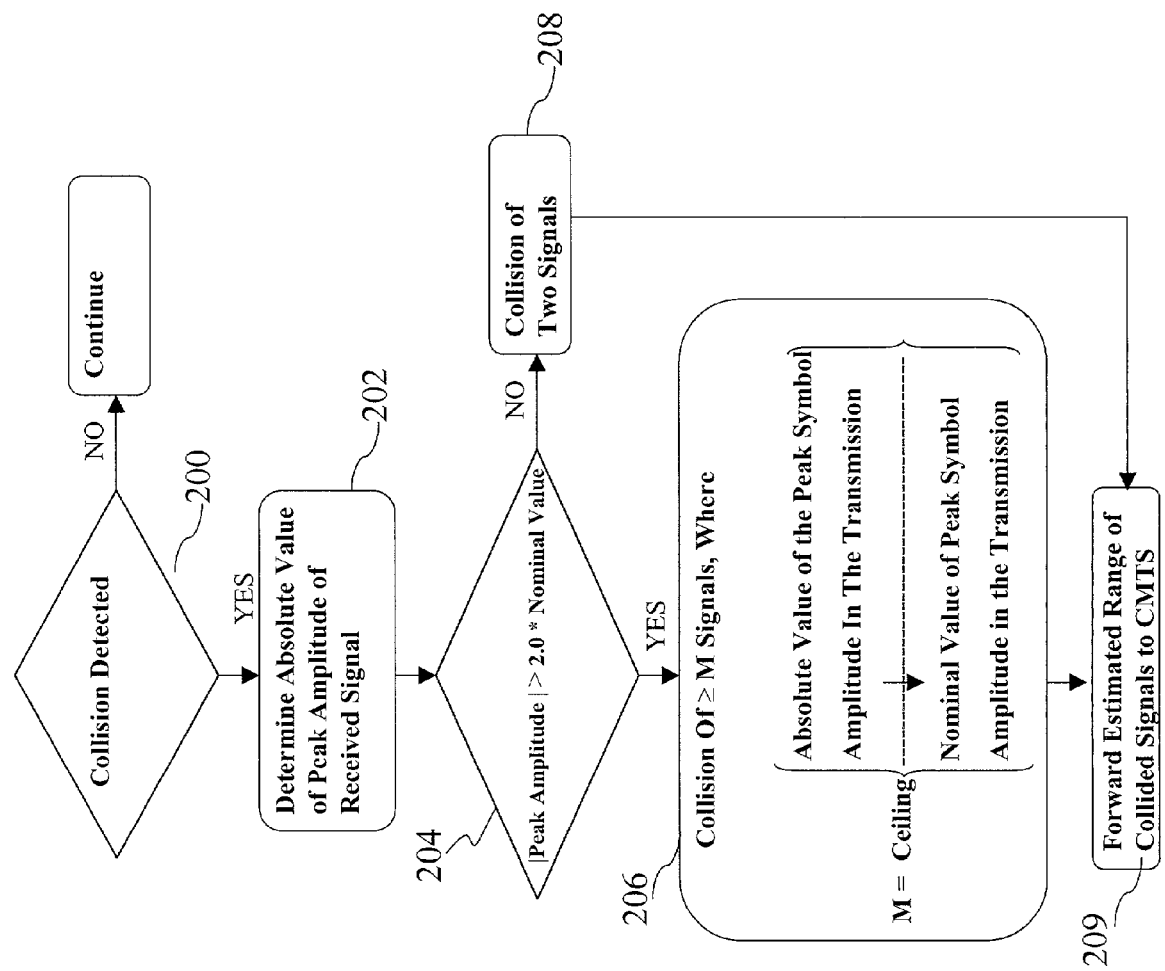
FIG. 10 is a flow diagram demonstrating the operation of an exemplary collision detection system wherein the number of colliding signals is estimated in accordance with the maximum signal amplitude in the receive packet in accordance with an exemplary embodiment of the present invention.

Referring to FIG. 10, in step 200, an exemplary collision detection system may therefore, initially determine that a collision has occurred on the upstream channel at the CMTS. Collisions may be detected by examining peak symbol power levels in the collided signal and observing when the difference between the maximum peak symbol power level and the minimum symbol peak power level in the collided signal is greater than a predetermined threshold, preferably in the range of about 1.5 to 2.0 dB. Alternately, an exemplary collision detection system may assume that a collision event occurred if the absolute value of the peak symbol amplitude is greater than a predetermined threshold, preferably in the range of about 1.2 to 1.7 times the nominal amplitude level for an uncollided signal.

In step 202, a peak detector of the described exemplary collision detection system may determine the absolute value of the maximum symbol amplitude of a collided signal in a contention mini-slot in which a collision has occurred. In one embodiment, an exemplary collision detection system compares the peak value of a collision event to the nominal peak value expected for single station transmissions. In step 204, the collision detection system determines if the peak value is more than a predetermined threshold, preferably in the range of approximately 2.0 to 2.5 times the nominal value. If the peak value is more than the predetermined threshold, a collision of M signals is estimated in step 206, where M=ceiling (the maximum symbol amplitude in the transmission divided by the nominal level of a single station transmission). Otherwise the collision detection system estimates that two signals collided in step 208. In step 209, the collision detection system then forwards the estimated number of collided signals to the MIPS core of the CMTS.

Figure 11:
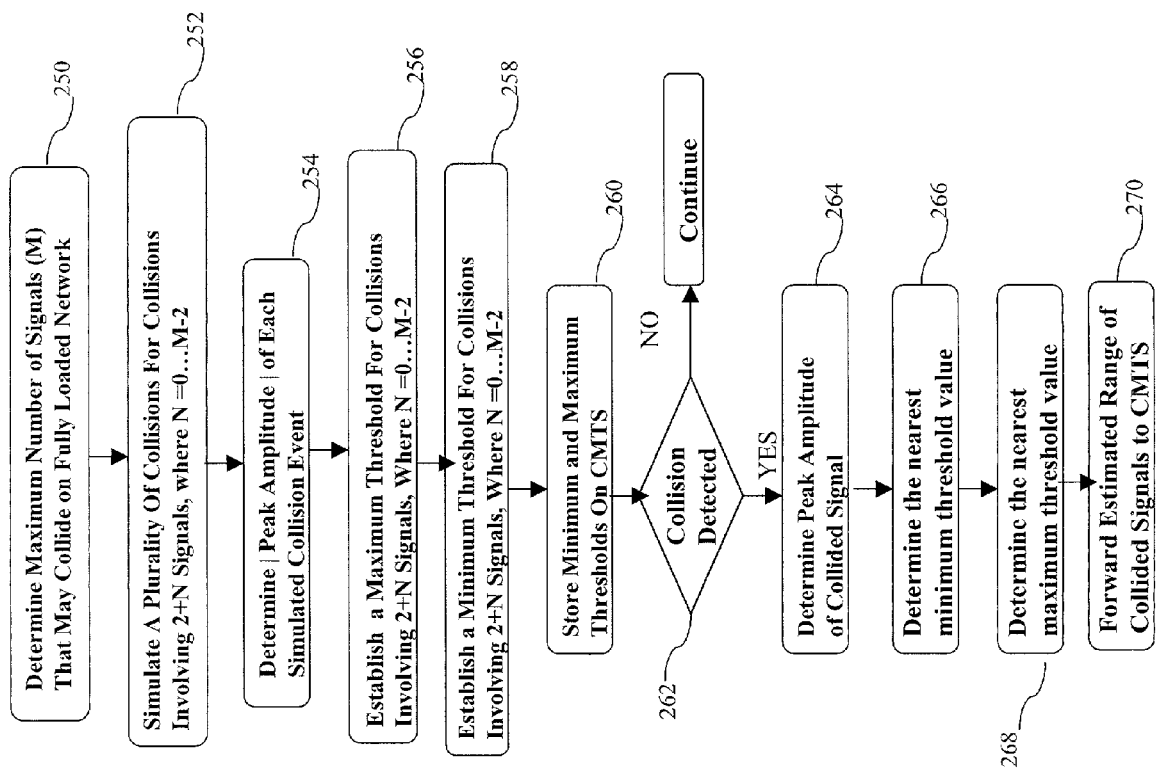
FIG. 11 is a flow diagram demonstrating the operation of an exemplary collision detection system wherein a range of colliding signals is estimated in accordance with the maximum signal amplitude in the received packet relative to predetermined minimum and maximum thresholds in accordance with an exemplary embodiment of the present invention.

An alternate collision detection system capitalizes on the fact that as the number of colliding signals becomes large, (in excess of about five to seven signals), the maximum possible peak drops significantly below the number of colliding signals times the nominal value. Referring to FIG. 11, in an alternate embodiment of the present invention, minimum and maximum thresholds are first developed through mathematical simulation or laboratory experiments. The thresholds may then be used to correlate the absolute value of the peak amplitude of a collided signal received on the upstream channel of a CMTS with the number of upstream signals that collided.

In step 250, an estimate is made of the maximum number of signals expected to collide on the upstream channel of the shared access network to develop the minimum and maximum thresholds. In one embodiment data traffic models appropriate for the services being delivered over the network may be incorporated into a computer simulation of the contention resolution algorithm to estimate the network collision patterns. In step 252, a plurality of collisions, preferably at least one thousand, are then mathematically simulated for collision events involving all number of stations expected to collide on the upstream channel of network, or a representative sample thereof.

In step 254, a peak amplitude detector of the collision detection system computes the absolute value of the peak amplitude for each of the simulated upstream collisions. The absolute value of the peak amplitudes may then be statistically analyzed to establish thresholds for estimating the minimum and maximum number of signals that collided.

In one embodiment, $5^{th}$ percentile thresholds, defined here as the value for which 5% of the peak amplitudes are larger than the percentile threshold, are calculated for a plurality of simulated collisions in accordance with the numbers of stations expected to collide on network. In step 256, the $5^{th}$ percentile thresholds may then be used to determine the maximum number of stations that collided. Similarly, $95^{th}$ percentile thresholds, defined here as the value for which 95% of the peak amplitudes are larger than the 95th percentile threshold, are calculated for a plurality of simulated collisions in accordance with the numbers of stations expected to collide on a fully loaded network.

In step 258, the $95^{th}$ percentile thresholds may then be used to determine the likely minimum number of stations that collided.

In step 260, the minimum and maximum thresholds may then be stored on the CMTS.

In step 262, an exemplary collision detection system may initially determine that a collision has occurred on the upstream channel at the CMTS when the difference between the maximum power level and the minimum power level in the collided waveform is greater than a predetermined threshold.

In step 264, an amplitude detector of an exemplary collision detection system may then determine the maximum symbol amplitude in a contention mini-slot within which a collision occurred.

In step 266, the collision detection system estimates the maximum number of colliding upstream signals by determining the nearest $5^{th}$ percentile value that is less than or equal to the detected peak.

Similarly, in step 268, the collision detection system may estimate the minimum number of colliding signals by determining the nearest 95th percentile value is greater than or equal to the detected peak.

In step 270, the collision detection system then forwards the estimated range of collided signals to the MIPS core of the CMTS.

The CRA and scheduler algorithm resident on the MIPS core of the CMTS may then adjust the number of time slots available in the request contention area in the upstream data path in accordance with the estimated number of collided signals. In this manner the number of time slots in the request contention area may be more closely aligned with network traffic patterns, thereby reducing system latency and increasing the overall network efficiency.

For example, referring to TABLE 1, if the detected collision peak amplitude is 4.3 times nominal, the next lowest 5% threshold is 4.1, indicating that the number of colliding signals is most likely less than or equal to nine. The next highest 95% threshold is 4.7, indicating that the number of colliding signals is most likely greater than or equal to five. Hence, the collision multiplicity detector reports to the MTS that the number of stations colliding is in the range of [5,9] inclusive.

TABLE 1

| # Stations | $5^{th}$ percentile | $95^{th}$ percentile |
| --- | --- | --- |
| 2 | 1.9 | 2.0 |
| 3 | 2.5 | 3.0 |
| 4 | 2.8 | 3.9 |
| 5 | 3.1 | 4.7 |
| 6 | 3.4 | 5.4 |
| 7 | 3.7 | 6.0 |
| 8 | 4.0 | 6.5 |

TABLE 1-continued

| # Stations | $5^{th}$ percentile | $95^{th}$ percentile |
| --- | --- | --- |
| 9 | 4.1 | 7.0 |
| 10 | 4.4 | 7.4 |
| 15 | 5.4 | 9.3 |
| 20 | 6.4 | 10.7 |
| 25 | 6.9 | 11.9 |

As a second example, if the peak amplitude is 9.5 times nominal, the collision multiplicity detector reports that the number of stations colliding is greater than or equal to 16 and less than or equal to twenty. Further, one of skill in the art, will appreciate that the number of colliding stations may be determined by calculating other statistics, such as for example, the peak to minimum value, average peak value, etc. In addition depending upon the design of the CRA the $5^{th}$ percentile and $95^{th}$ percentile values may be replaced by other percentile values such as for example, the $1^{st}$ and $99^{th}$ percentile values. In addition, the table can be generated for all numbers of stations expected to collide on a network.

Further, impulse noise during a collision event may degrade the accuracy of the described collision detection system. Therefore, an alternate collision detection system may utilize a correlation function to determine the number of colliding signals on the upstream channel in accordance with the correlation function. The use of a correlation function reduces the impact of impulse noise on the integrity of the multiplicity collision estimation.

In operation, the peak power level in a collision event on the upstream channel occurs when the signals that collide have symbols that add mostly in-phase. Therefore, the symbol with the largest amplitude (peak symbol), that results from the addition of two or more, relatively in phase symbols, resembles a single symbol of an un-collided waveform.

Figure 12:
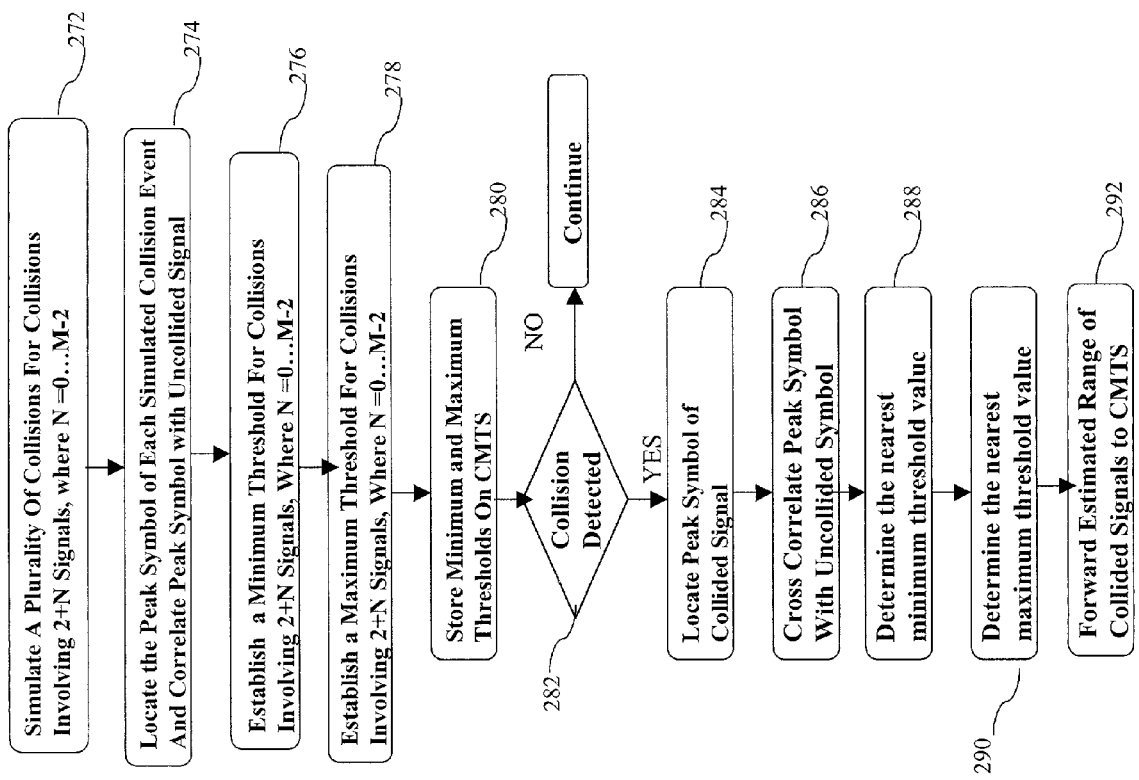
FIG. 12 is a flow diagram demonstrating the operation of an exemplary collision detection system wherein a range of colliding signals is estimated in accordance with the cross correlation of the peak symbol in the received packet with a single uncollided symbol in accordance with an exemplary embodiment of the present invention.

Referring to FIG. 12, in an alternate embodiment of the present invention minimum and maximum thresholds are again developed through mathematical simulation or laboratory experiments. The thresholds may then be used to cross correlate the peak symbol of a collided signal received on the upstream channel of a CMTS with the number of signals that collided.

In step 272, to develop the minimum and maximum thresholds, a plurality of collisions are again mathematically simulated for collisions involving 2+N signals where N is the number of signals expected to collide on a network. In the described exemplary embodiment, preferably at least one thousand collisions are simulated for each collision event. The described exemplary collision detection system may then cross correlate the peak symbol of each of the plurality of simulated collisions, with every possible waveform representation of a single un-collided symbol (e.g. four, for QPSK) to determine the maximum cross correlation value.

In step 274, in an alternative embodiment, cross correlations are preferably performed for collisions involving all numbers of signals expected to collide.

In steps 276 and 278, the cross correlations are statistically analyzed to establish thresholds for estimating the minimum and maximum number of signals that collided, respectively.

In step 280, the minimum and maximum thresholds may then be stored on the CMTS. One of skill in the art will understand that the accuracy of the thresholds will improve with increasing number of simulated collision events.

In one embodiment, $5^{th}$ percentile thresholds, defined here as the value for which 5% of the maximum cross correlation values are larger than the $5^{th}$ percentile thresholds, are again calculated for simulated collisions involving a representative number of colliding signals. The $5^{th}$ percentile thresholds may then be used to determine the maximum number of stations that collided. Similarly, $95^{th}$ percentile thresholds, defined here as the value for which 95% of the maximum cross correlation values are larger than the $95^{th}$ percentile thresholds, are also calculated for collisions involving a representative number of colliding signals. The $95^{th}$ percentile thresholds may then be used to determine the likely minimum number of stations that collided.

In step 282, an exemplary collision detection system may again initially determine that a collision has occurred on the upstream channel at the CMTS when the difference between the maximum power level and the minimum power level in the collided waveform is greater than a predetermined threshold.

In step 284, the collision detection system may then locate the symbol with the largest amplitude (peak symbol) that results from the addition of two or more relatively in phase symbols.

In step 286, the peak symbol of the collided signal is then cross correlated with each possible waveform representation of a single uncollided symbol to determine the maximum cross correlation value.

In step 288, the collision detection system then estimates the maximum number of colliding signals by determining the nearest percentile value that is less than or equal to the maximum cross correlation value.

In step 290, the collision detection system may estimate the minimum number of colliding signals by determining the nearest $95^{th}$ percentile value that is greater than or equal to the maximum cross correlation value.

In step 292, the collision detection system then forwards the estimated range of collided signals to the MIPS core of the CMTS.

The CRA and scheduler algorithm resident on the MIPS core of the CMTS may then adjust the number of time slots available in the request contention area in the upstream data path in accordance with the estimated number of collided signals. In this manner the number of time slots in the request contention area may be more closely aligned with network traffic patterns, thereby reducing system latency and increasing the overall network efficiency.

For systems that utilize higher order modulation techniques, such as 16-QAM or 64-QAM, the received waveform may be correlated with a filter bank representing each expected symbol. Alternately, since precise sample timing is not important for the purpose of collision detection, a generalized symbol (that may only be a single member of the signal basis set) may be used.

Figure 13:
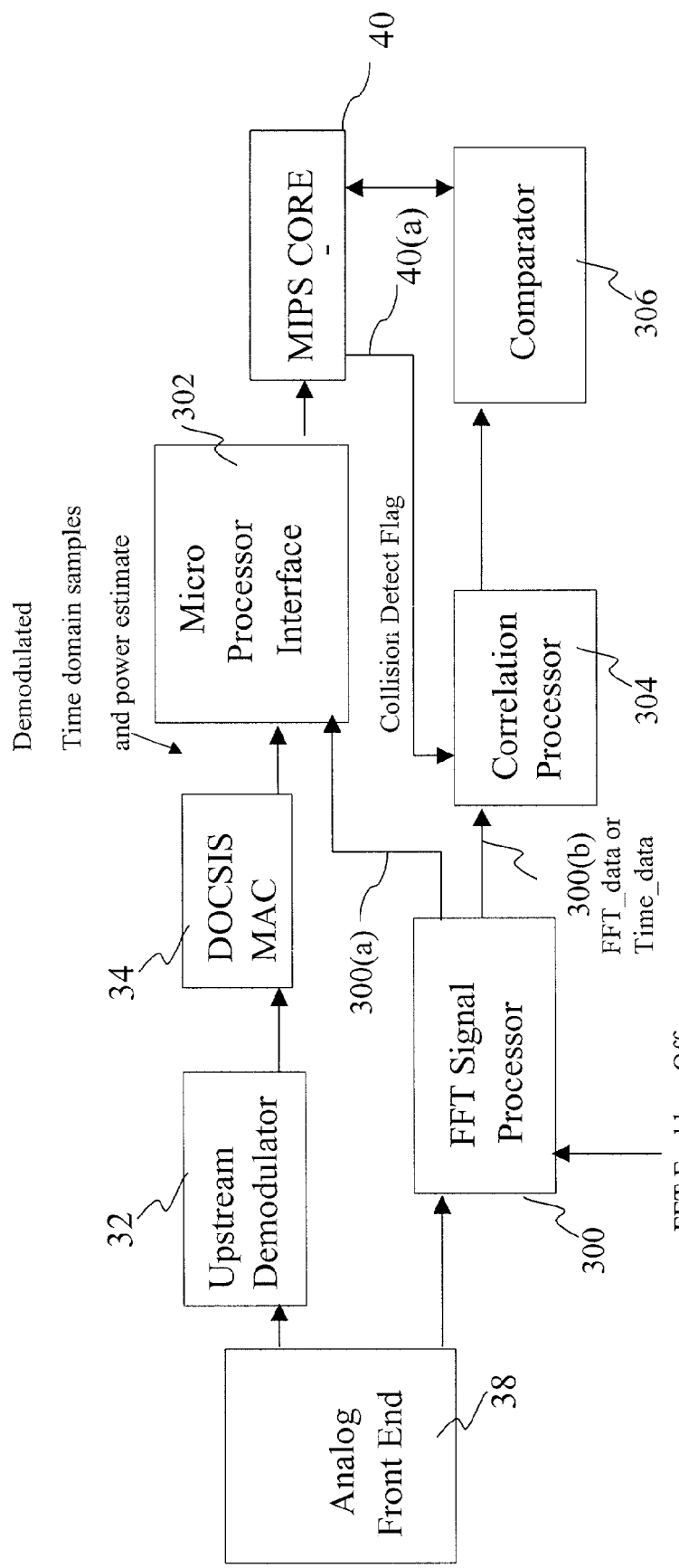
FIG. 13 is a simplified block diagram of a collision detection system in accordance with an exemplary embodiment of the present invention.

A simplified block diagram of an exemplary implementation of a collision detector incorporated into a CMTS is depicted in FIG. 13. The analog front end 38 provides sampled waveforms simultaneously to conventional signal processing circuitry, in this instance the upstream demodulator 32 and the DOCSIS MAC 34, and to a parallel signal processor 300 (e.g., a FFT processor). The FFT processor 300 may pass the time sampled waveforms without performing the FFT 300(*a*) on to the microprocessor interface 302, and then to the MIPS core 40 of the CMTS. In this instance the MIPS core 40 analyzes the waveform that results from the collision event and implements the collision multiplicity estimation algorithm.

Alternatively, a correlation processor 304 and comparator 306 dedicated to the estimation of collision multiplicity may be integrated with the FFT processor 300 for faster execution of collision multiplicity. In the described exemplary embodiment, the MIPS core 40 passes a collision detection flag 40(*a*) to the correlation processor 304 so that the collision multiplicity estimate may be promptly executed after the received packet is determined to be the result of a collision event by the MIPS core 40 of the CMTS.

The correlation processor 304 cross correlates the received waveform with the typical uncollided symbol or an FFT of the typical uncollided symbol. The comparator 306 compares the cross correlation with the minimum and maximum thresholds determined by mathematical simulation as described above, and passes an estimate of the number of signals that collided to the MIPS core 40 of the CMTS. The present invention may be applied in parallel with conventional signal processing circuitry so that a collision estimate may be produced for each request region time slot.

Although a preferred embodiment of the present invention has been described, it should not be construed to limit the scope of the appended claims. This invention is not to be limited to the specific arrangements and constructions shown and described. Rather the present invention may be utilized for collision detection in any shared access RF network, such as for example wireless, powerline data, satellite and voice networks. Those skilled in the art will understand that various modifications may be made to the described embodiment.

Figure 14:
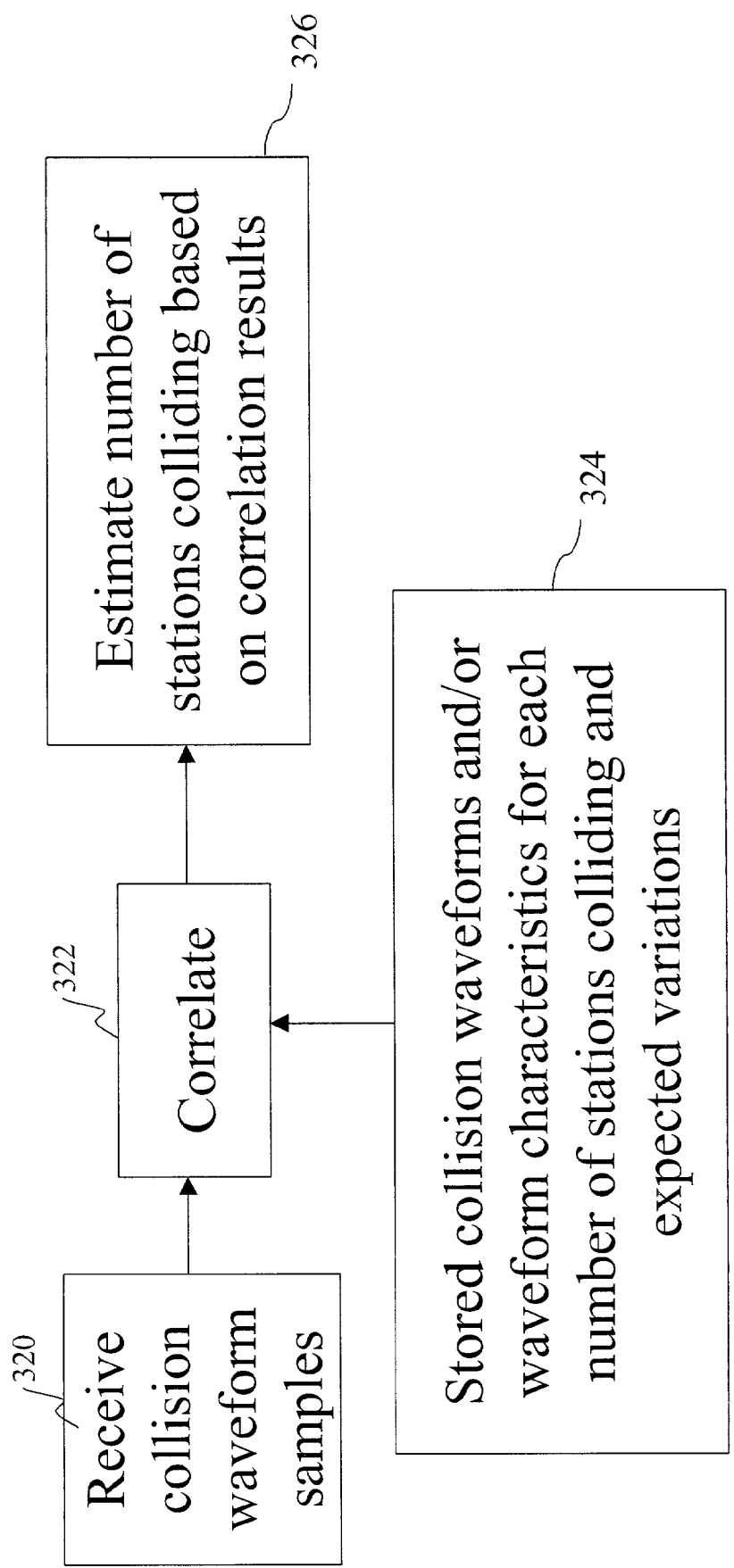
FIG. 14 is a flow diagram of an alternate collision detection system wherein the number of colliding signals is estimated in accordance with the correlation of the received waveform with a plurality of stored waveforms in accordance with an exemplary embodiment of the present invention.

For example, referring to FIG. 14, an alternate collision detection system compares the entire waveform that results from a collision event (hereinafter referred to as a collision waveform) to a stored set of collision waveforms to estimate the number of colliding signals or collision multiplicity. The alternate embodiment receives the digitized collision waveform 320 and performs a complete waveform correlation 322 with stored collision waveforms 324 to estimate the collision multiplicity 326.

In one embodiment a cross correlation function, as is known in the art, may be used to show how similar the received and stored waveforms are and how long the signals remain similar when one is shifted with respect to the other. In this embodiment, the number of colliding signals may be determined in accordance with the stored waveform that has the largest correlation function with respect to the received collided signal. The alternate embodiment performs a complete waveform correlation with stored or predicted collision waveforms to estimate the collision multiplicity.

Further, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

The invention claimed is:

1. A method for detecting collisions on a shared access network, comprising:
    modulating a preamble of each of a plurality of RF modulated signals with a plurality of different phase states;
    transmitting two or more of the RF modulated signals, wherein two or more of the transmitted signals collide at a central controller resulting in a collision signal having an amplitude determined by the combination of the corresponding different phases in the two or more transmitted signals;
    correlating the collision signal with a plurality of stored parameters; and
    determining the number of transmitted signals that collided as a function of said correlation.

2. The method of claim 1 further comprising modulating a payload of the transmitted signals to increase the number of different phase states in the payload.

3. The method of claim 1 further comprising generating a random binary sequence in a preamble of the transmitted signals to increase the number of different phase states in the preamble.

4. The method of claim 1 further comprising generating a random binary sequence in a payload of the transmitted signals to increase the number of different phase states in the payload.

5. A method for detecting collisions on a shared access network, comprising:
- modulating a preamble of each of a plurality of RF modulated signals with a plurality of different phase states;
- transmitting two or more of the RF modulated signals, wherein two or more preambles of the transmitted signals collide at a central controller to create a collision signal based on the different phase states of each preamble;
- determining a characteristic of the collision signal;
- comparing the characteristic with a plurality of predetermined thresholds; and
- determining the number of the transmitted signals that collided as a function of the comparison.

6. The method of claim 5 further comprising:
- monitoring a plurality of collision events;
- determining the characteristic of each of the plurality of collision events; and
- determining the predetermined thresholds in accordance with the characteristics of the collision events.

7. The method of claim 6 wherein determining a characteristic of each of the plurality of collision events comprises determining a peak power of each of the plurality of collision events, wherein the predetermined thresholds are determined in accordance with the peak power of each of the plurality of collision events.

8. The method of claim 7 wherein determining the predetermined thresholds in accordance with the peak power of each of the collision events comprises statistically analyzing the peak power of each of the plurality of collision events to establish minimum thresholds for estimating a minimum number of signals that collided.

9. The method of claim 8 wherein determining the number of transmitted signals that collided as a function of the comparison of the characteristic of the collided signals and a plurality of predetermined thresholds comprises comparing peak power of the collided signal to the minimum thresholds.

10. The method of claim 7 wherein determining the predetermined thresholds in accordance with the peak power of each of the collision events comprises statistically analyzing the peak power of each of the plurality of collision events to establish maximum thresholds for estimating a maximum number of signals that collided.

11. The method of claim 9 wherein determining the number of transmitted signals that collided as a function of the comparison of the characteristic of the collided signal and a plurality of predetermined thresholds comprises comparing peak power of the collided signal to the maximum thresholds.

12. The method of claim 6 wherein determining a characteristic of each of the plurality of collision events comprises locating a peak symbol of each of the plurality of collision events, wherein the predetermined thresholds are determined in accordance with the peak symbol of each of the plurality of collision events.

13. The method of claim 12 wherein determining the predetermined thresholds in accordance with the peak symbol of each of the collision events comprises cross correlating the peak symbol of each of the plurality of collision events with an uncollided symbol and statistically analyzing the cross correlations to establish minimum thresholds for estimating a minimum number of signals that collided.

14. The method of claim 13 wherein determining the number of transmitted signals that collided as a function of the comparison of the characteristic of the collided signal and a plurality of predetermined thresholds comprises comparing a cross correlation of the peak symbol of the collided signal with an uncollided signal and comparing the cross correlation to the minimum thresholds.

15. The method of claim 5 further comprising modulating a preamble of the transmitted signals to increase the number of different phase states in the preamble.

16. The method of claim 5 further comprising modulating a payload of the transmitted signals to increase the number of different phase states in the payload.

17. The method of claim 5 further comprising generating a random binary sequence in a preamble of the transmitted signals to increase the number of different phase states in the preamble.

18. The method of claim 5 further comprising generating a random binary sequence in a payload of the transmitted signals to increase the number of different phase states in the payload.

19. The method of claim 5 further comprising adjusting a number of time slots available in a request contention area in accordance with a number of RF modulated signals that collided.

20. A method for detecting collisions on a shared access RF network, comprising:
- formatting transmit data packets to include a plurality of different phase states;
- modulating a preamble of each of the transmit data packets to include a number of different phase states in the preamble;
- determining a characteristic of a collision signal caused by a collision between two or more of the transmit data packets;
- correlating the characteristic of the collision signal with a plurality of stored parameters; and
- determining the number of transmitted signals data packets that collided as a function of the correlation.

21. The method of claim 20 wherein formatting transmit data packets to include the plurality of different phase states comprises generating a random binary sequence in the preamble of the transmit data packet to increase the number of different phase states in the preamble.

22. The method of claim 20 wherein formatting transmit data packets to include the plurality of different phase states comprises generating a random binary sequence in a payload of the transmit data packet to increase the number of different phase states in the payload.

23. The method of claim 20 further comprising adjusting the number of time slots available in a request contention area in accordance with the number of RF modulated signals that collided.

24. A method for detecting collisions on a shared access RF network, comprising:
- detecting an occurrence of a collision event;
- determining an absolute value of peak amplitude of a collision signal;
- comparing the absolute value of the peak amplitude with a predetermined threshold; and
- determining the number of transmitted signals that collided as a function of the comparison by assuming two or more signals collided when the absolute value of the peak amplitude of the collision signal is less than twice the amplitude of the uncollided signal.

25. A method for detecting collisions on a shared access RF network, comprising:
   simulating a plurality of collisions;
   determining a peak amplitude of each of the simulated collisions;
   establishing maximum thresholds as a function of the peak amplitudes of the simulated collisions;
   establishing minimum thresholds as a function of the peak amplitudes of the simulated collisions;
   storing the minimum and maximum thresholds;
   detecting an occurrence of a collision event;
   determining a peak amplitude of a collided signal;
   comparing the peak amplitude of collided signal to the minimum and maximum thresholds; and
   determining the number of transmitted signals that collided as a function of the comparison.

26. A method for detecting collisions on a shared access RF network, comprising:
   simulating a plurality of collisions;
   locating a peak symbol of each of the simulated collisions;
   cross correlating the peak symbol with uncollided symbol waveforms;
   establishing maximum thresholds as a function of the cross correlation of the peak symbol with the uncollided symbol waveforms;
   establishing minimum thresholds as a function of the cross correlation of the peak symbol with the uncollided symbol waveforms;
   storing the minimum and maximum thresholds;
   detecting an occurrence of a collision event;
   locating a peak symbol of a collided signal;
   correlating the peak symbol with the uncollided symbol waveforms; and
   determining the number of transmitted signals that collided as a function of the correlation.

27. A collision detection system for shared access RF networks, comprising:
   a correlation processor for correlating a characteristic of a collided RF waveform with a plurality of stored characteristics, wherein a number of received signals involved in a collision event is determined in accordance with the correlation; and
   a peak detector coupled to the correlation processor for determining an absolute value of a peak amplitude of the collided RF waveform, wherein the correlation processor cross correlates the absolute value of the peak amplitude with a predetermined threshold, wherein the correlation processor determines the number of transmitted signals that collided as a function of the correlation.

28. A data communication system, comprising:
   two or more subscriber RF transceivers, each subscriber RF transceiver being configured to transmit one or more RF modulated signals having a preamble being modulated to have a plurality of different phase states;
   a collision detection system that includes a correlation processor for correlating a characteristic of a collided RF waveform with a plurality of stored characteristics, wherein the number of transmitted RF modulated signals involved in a collision event is determined in accordance with the correlation.

29. The data communication system of claim 28 further comprising:
   a peak detector coupled to the correlation processor for detecting a peak amplitude of the collided RF waveform, wherein the correlation processor correlates the peak amplitude of the collided RF waveform with a plurality of stored values to determine the number of received signals involved in the collision event.

30. The data communication system of claim 28 further comprising;
   a peak detector coupled to the correlation processor for detecting a peak symbol of said collided RF waveform, wherein the correlation processor cross correlates the peak symbol with a predetermined uncollided symbol; and
   a comparator coupled to said correlation processor to compare the cross correlation with a plurality of stored values to determine the number of received signals involved in the collision event.

31. The data communication system of claim 28 wherein each of the subscriber RF transceivers comprises an upstream modulator for transmitting an RF modulated signal having a plurality of different phase states.

32. The data communication system of claim 28 wherein each of the subscriber RF transceivers comprises an upstream modulator for modulating a preamble of the transmitted signals to increase the number of different phase states in the preamble.

33. The data communication system of claim 28 wherein each of the subscriber RF transceivers comprises an upstream modulator for modulating a payload of the transmitted signals to increase the number of different phase states in the payload.

34. The data communication system of claim 28 wherein each of the subscriber RF transceivers comprises an upstream modulator for generating a random binary sequence in a preamble of the transmitted signals to increase the number of different phase states in the preamble.

35. The data communication system of claim 28 wherein each of the subscriber RF transceivers comprises an upstream modulator for generating a random binary sequence in a payload of the transmitted signals to increase the number of different phase states in the payload.

36. A method for detecting collisions on a shared access RF network, comprising:
   detecting the occurrence of a collision event;
   determining absolute value of peak amplitude of collision signal;
   comparing the absolute value of the peak amplitude with a predetermined threshold; and
   determining the number of transmitted signals that collided as a function of the comparison by assuming the number of signals that collided is greater than or equal to a ceiling of the absolute value of the peak amplitude of the collision signal divided by a nominal value of the peak amplitude in an uncollided signal.

* * * * *